(12) United States Patent
Shmouely et al.

(10) Patent No.: US 10,678,665 B2
(45) Date of Patent: Jun. 9, 2020

(54) CLOUD PLATFORM EXPERIMENTATION SYSTEM

(71) Applicant: Microsoft Technology Licensing, LLC, Redmond, WA (US)

(72) Inventors: Meir Shmouely, Sammamish, WA (US); Charles Joseph Torre, Seattle, WA (US); Cheng Ding, Bellevue, WA (US); Sekhar Poornananda Chintalapati, Redmond, WA (US); Ritchie Nicholas Hughes, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 15/985,524

(22) Filed: May 21, 2018

(65) Prior Publication Data
US 2019/0354454 A1 Nov. 21, 2019

(51) Int. Cl.
*G06F 11/00* (2006.01)
*G06F 11/26* (2006.01)
(Continued)

(52) U.S. Cl.
CPC ........ *G06F 11/261* (2013.01); *G06F 9/45558* (2013.01); *G06F 11/0709* (2013.01);
(Continued)

(58) Field of Classification Search
CPC ............................ G06F 11/22; G06F 11/2205
(Continued)

(56) References Cited

U.S. PATENT DOCUMENTS 9,628,339 B1 4/2017 Thai et al.
2007/0300228 A1* 12/2007 White, III ........... H04L 41/0681
718/102
(Continued)

OTHER PUBLICATIONS

Cotroneo, et al., "Network Function Virtualization: Challenges and Directions for Reliability Assurance", In Proceedings of IEEE International Symposium on Software Reliability Engineering Workshops., Nov. 3, 2014, pp. 37-42.
(Continued)

*Primary Examiner* — Sarai E Butler
(74) *Attorney, Agent, or Firm* — Alleman Hall Creasman & Tuttle LLP

(57) ABSTRACT

A computer system is provided that includes a cloud platform that includes a plurality of nodes. Each node includes a processor configured to run virtual machines. The cloud platform includes a fault condition injection engine configured to generate fault conditions on selected nodes of the plurality of nodes. The computer system further includes a user interface system configured to receive user input of fault condition experimentation parameters from a user for a target virtual machine associated with the user. The cloud platform allocates a set of nodes of the plurality of nodes for a controlled sandbox environment configured to run the target virtual machine of the user. The fault condition injection engine generates fault conditions on the allocated set of nodes based on the fault condition experimentation parameters.

20 Claims, 6 Drawing Sheets

(51) Int. Cl.
G06F 9/455 (2018.01)
G06F 11/07 (2006.01)
G06F 11/22 (2006.01)
G06F 11/273 (2006.01)
G06F 11/277 (2006.01)
G06F 21/53 (2013.01)
H04L 29/08 (2006.01)

(52) U.S. Cl.
CPC ........ *G06F 11/2215* (2013.01); *G06F 11/277* (2013.01); *G06F 11/2733* (2013.01); *G06F 21/53* (2013.01); *H04L 67/10* (2013.01); *G06F 2009/45591* (2013.01); *G06F 2009/45595* (2013.01); *G06F 2201/815* (2013.01)

(58) Field of Classification Search
USPC .......................................................... 714/41
See application file for complete search history.

(56) References Cited

U.S. PATENT DOCUMENTS

| | | | |
|---|---|---|---|
| 2010/0107015 A1* | 4/2010 | Bernabeu-Auban | G06F 11/008 714/38.14 |
| 2013/0111260 A1 | 5/2013 | Reddy et al. | |
| 2013/0262912 A1* | 10/2013 | Dasari | G06F 1/266 714/3 |
| 2015/0127974 A1* | 5/2015 | Jiekak | G06F 11/1092 714/6.24 |
| 2016/0011952 A1* | 1/2016 | Tejerina | G06F 11/30 714/41 |
| 2016/0204923 A1* | 7/2016 | Ashok | H04L 67/10 709/226 |
| 2017/0024299 A1* | 1/2017 | Deng | G06F 11/3414 |
| 2017/0242784 A1* | 8/2017 | Heorhiadi | H04L 41/5038 |
| 2018/0089011 A1* | 3/2018 | Basiri | G06F 9/5077 |
| 2018/0359159 A1* | 12/2018 | Calo | H04L 41/5035 |

OTHER PUBLICATIONS

Le, et al., "Fault Injection in Virtualized: Systems—Challenges and Applications", In Proceedings of IEEE Transactions on Dependable and Secure Computing, vol. 12, Issue 3, May 1, 2015, 14 Pages.

"International Search Report and Written Opinion Issued in PCT Application No. PCT/US2019/030794", dated Aug. 22, 2019, 14 Pages.

Schermann, et al., "Bifrost- Supporting Continuous Deployment with Automated Enactment of Multi-Phase Live Testing Strategies", In Proceedings of the 17th International Middleware Conference. ACM,, Nov. 28, 2016, 14 pages.

* cited by examiner

CLOUD PLATFORM EXPERIMENTATION SYSTEM

BACKGROUND

Many developers are building cloud applications that are run on cloud platforms that provide infrastructure as a service. Typically, as they have no control over the cloud platform infrastructure, these developers are unable to evaluate the resiliency of their cloud applications to infrastructure failures of the cloud platform before deploying to production. As a result, developers may not be able to ensure that their cloud application is resilient to a given infrastructure failure until that failure happens during production.

SUMMARY

A computer system is provided that may include a cloud platform that includes a plurality of nodes. Each node may include a processor configured to run virtual machines. The cloud platform may include a fault condition injection engine configured to generate fault conditions on selected nodes of the plurality of nodes. The computer system may further include a user interface system configured to receive user input of fault condition experimentation parameters from a user for a target virtual machine associated with the user. The cloud platform may allocate a set of nodes of the plurality of nodes for a controlled sandbox environment configured to run the target virtual machine of the user. The fault condition injection engine may generate fault conditions on the allocated set of nodes based on the fault condition experimentation parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
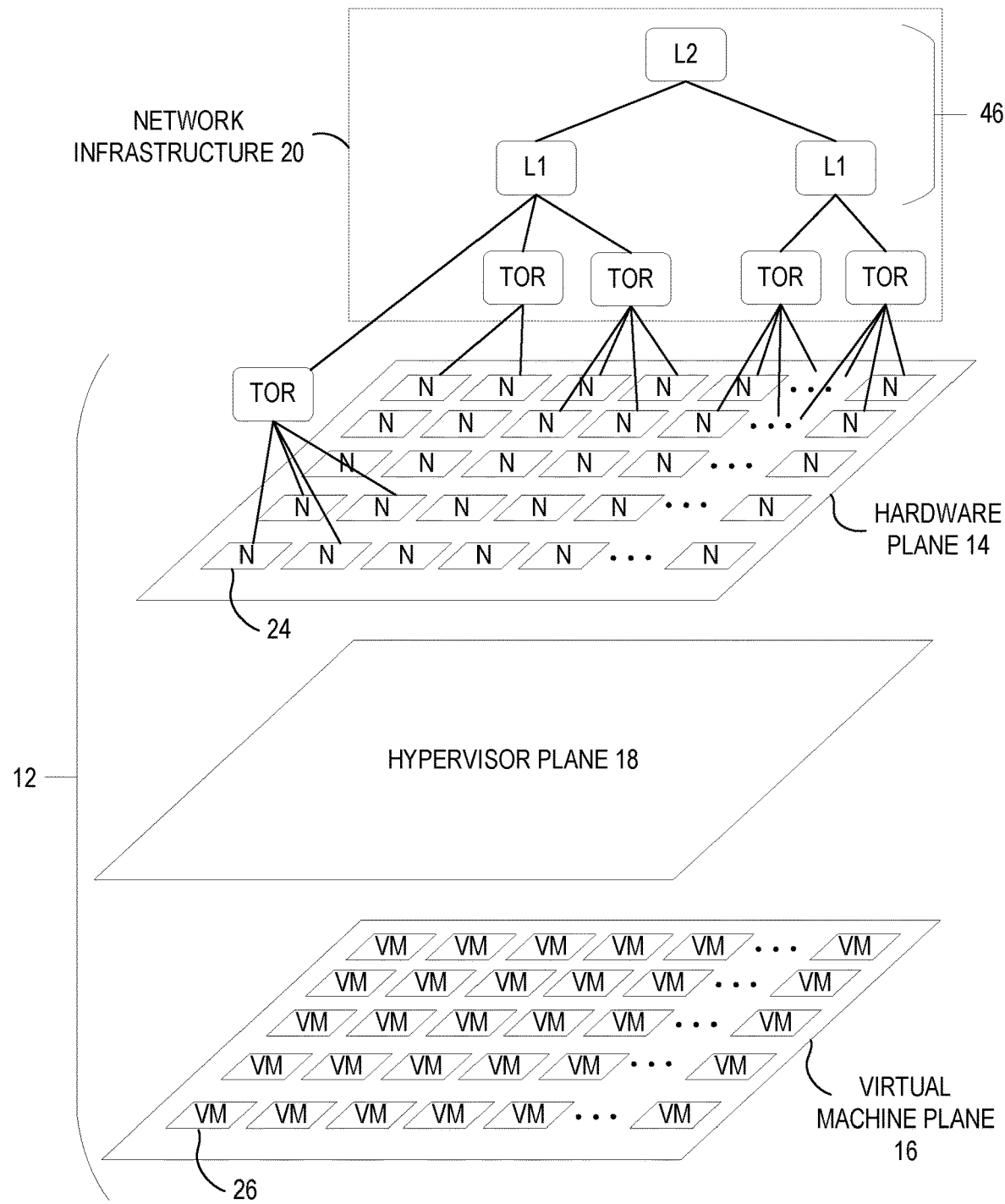
FIG. 1 is a schematic view that shows an example cloud platform of the present description.

FIG. 1 illustrates a computer system 10 that includes a hardware plane 14, a virtual machine plane 16, a hypervisor plane 18, and network infrastructure 20 that are collectively configured to operate a cloud platform 22. The hardware plane 14 includes a collection of nodes 24 (each denoted by the symbol "N" in FIG. 1) that may include processors, graphics processing units (GPU), volatile memory, and other computer components configured to run host server instances. The host server instances executed by the nodes 24 of the hardware plane 14 are configured to communicate with one or more hypervisors of the hypervisor plane 18. The one or more hypervisor of the hypervisor plane 18 may create, handle, and monitor a plurality of virtual machines 26 (each denoted by the symbol "VM" in FIG. 1) of the virtual machine plane 16. Through the hypervisor plane 18, each virtual machine 26 of the virtual machine plane 16 may be hosted and run by the hardware components of one or more nodes 24 of the hardware plane 14. In this manner, the plurality of virtual machines 26 of the virtual machine plane 16 may share virtualized hardware resources managed by the hypervisor plane 18. Each virtual machine 26 provides a simulated computer environment within which guest software, such as, for example, cloud applications may be executed.

Figure 2:
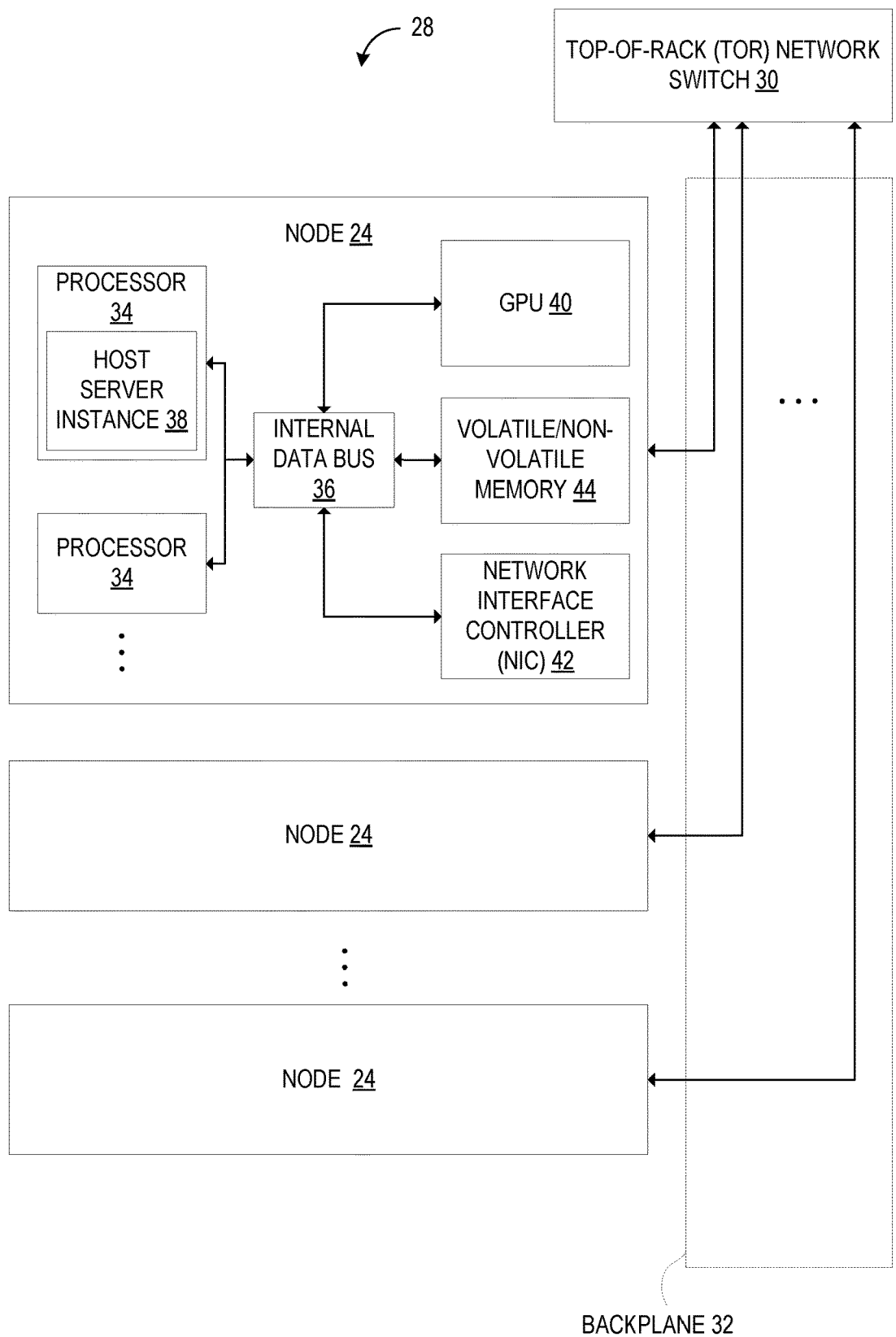
FIG. 2 is a schematic view that shows a node cluster of the example cloud platform of FIG. 1.

In one example, the computer system 10 corresponds to a data center environment configured to operate the cloud platform 22 that communicatively couples the plurality of nodes 24 via standard network infrastructure. Turning to FIG. 2, the plurality of nodes 24 may be organized into a plurality of node clusters 28. Each node cluster 28 may include a top of rack (TOR) network switch 30, two or more nodes of the plurality of nodes 24, and a backplane 32 communicatively coupling the top of rack network switch 30 and nodes 24. For example, each node cluster 28 may correspond to a server rack that provides physical structure, ventilation, etc., for a TOR switch 30 and a plurality of nodes 24 that are located physically proximate to each other in the same server rack. The backplane 32 communicatively coupling each node in the server rack may facilitate a low latency and high bandwidth exchange of network packets between nodes in the same server rack.

As illustrated in FIG. 2, each node 24, in the node cluster 28 includes at least one processor 34 communicatively coupled to other hardware components by an internal data bus 36. The at least one processor 34 may execute a host server instance 38. As shown, each server may include more than one processor 24 that may each execute separate host server instances 38, or may collectively execute a single host server instance. In one example, the internal data bus 216 may take the form of a Peripheral Component Interconnect Express (PCIe) link, for example. Data buses of other formats may alternatively be used. It should be appreciated that "internal" as used in the term "internal data bus" refers to the fact that at least a portion of the data bus is typically housed in the same housing (which serves as a Faraday cage) as the processor 34 of the node 24, and should be understood to encompass a data bus that connects a processor of a node in a housing with internally mounted hardware components and/or to externally coupled hardware components plugged into, e.g., a port on an external surface of the housing of the node. As illustrated, each node 24 may include other suitable hardware components, such as, for example, a GPU 40, a network interface controller (NIC) 42, volatile and non-volatile memory 44, etc. It should be appreciated that the nodes 24 are not limited to the illustrated hardware components, but may include any suitable configuration of hardware components configured for operating the cloud platform 22. Additionally, it should be appreciated that while the nodes 24 are illustrated as being clustered in a server rack configuration, other types of network infrastructure and housing configurations may be utilized to couple the plurality of nodes 24 and operate the cloud platform 22.

Turning back to FIG. 1, the network infrastructure 20 may include typical network infrastructure to couple the nodes 24 within a node cluster together, such as server racks including TOR network switches. The computer system 10 may include a plurality of node clusters that each have an associated TOR network switch, and may have the architecture described in FIG. 2. Network infrastructure 20 may further include higher-level switching infrastructure 46 (L1) and (L2) that connects the TOR network switches together. The higher-level switching infrastructure 46 may take the form of any suitable networking architecture, and may be driven by any suitable routing protocol(s). In the illustrated example, the higher-level infrastructure 46 includes a collection of aggregation switches L1 and core switches L2. However, it will be appreciated that the higher-level switching infrastructure may include any suitable number of levels of switches.

Each host server instance 38 executed via processors 34 of the nodes 24 may communicate with other host server instances 38 through the network infrastructure 20. The collective host server instances 38 manages the collective hardware resources of the hardware plane 14, which may be utilized to run the virtual machines 26 of the virtual machine plane 16 through the hypervisor plane 18. In one example, the virtual machines 26 utilization of the hardware resources of host nodes the hardware plane 14 is controlled by the hypervisor plane 18, and the virtual machines 26 may not directly access the nodes 24 themselves. The virtual machines 26 of the virtual machine plane 16 provide a virtual computing environment within which users of the cloud platform 22 may execute cloud applications. During execution of a cloud application, the hypervisor plane 18 may allocate hardware resources of one or more nodes 24 of the hardware plane 14 to run the cloud application. The hypervisor plane 18 may allocate the hardware resources of the nodes 24 in a changeable and scalable manner, such that additional nodes 24 may be allocated to a particular virtual machine 26, and already allocated nodes 24 may be reduced, transferred, or otherwise changed for that particular virtual machine 26 while the cloud application is running.

It should be appreciated that the nodes 24 of the hardware plane 14 may have a variety of difference hardware components. That is, a first node of the hardware plane 14 may have a different type/version of a processor, GPU, volatile/non-volatile memory, etc., than a second node of the hardware plane 14. Additionally, different node clusters 28 of the computer system 10 may be located in different locations, such as, for example, difference countries and continents. However, using the network infrastructure 20, these difference node clusters 28 may communicate, and their collective hardware resources may be utilized to by the hypervisor plane 18 to run the virtual machines 26 of the virtual machine plane 16. It should be appreciated that the cloud platform 22 infrastructure described above and illustrated in FIGS. 1 and 2 are merely exemplary, and that other networking infrastructures and organization methods not specifically described herein may also be utilized.

It will be appreciated that the hardware environment of computer system 10 in FIG. 1 and the nodes 24 of the node clusters 28 in FIG. 2 may experience various hardware and software fault conditions during normal operation. These failures may adversely affect the software applications deployed thereto, as described below.

Figure 3:
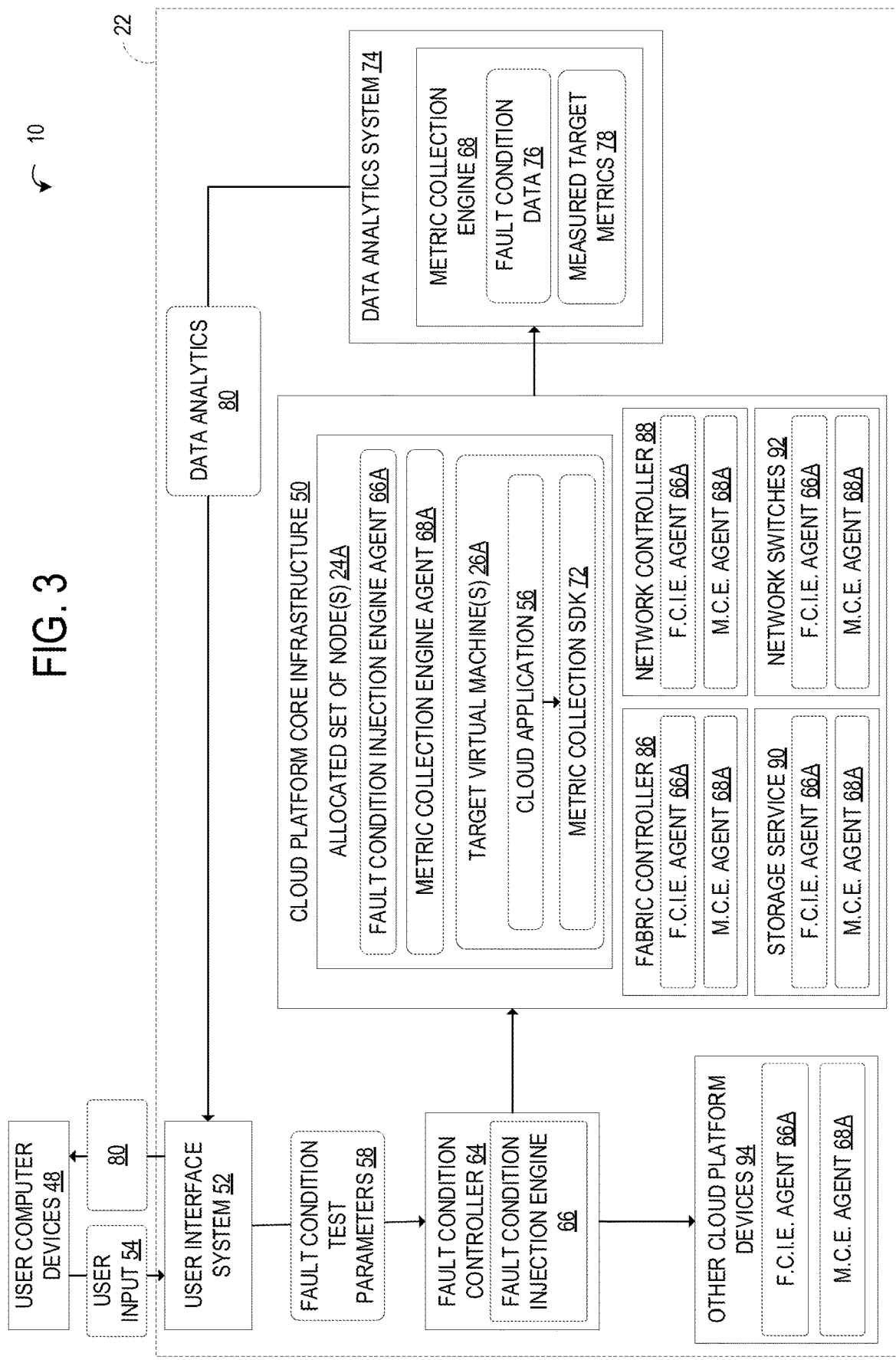
FIG. 3 is a schematic view that shows an example computer system for fault condition experimentation using the cloud platform of FIG. 1.

FIG. 3 illustrates the computer system 10 that includes the cloud platform 22 configured to communicate with user computer devices 48. The cloud platform 22 includes cloud platform core infrastructure 50, which may include a plurality of nodes 24, each node including a processor 34 configured to run virtual machines 26. In one example, the cloud platform core infrastructure 50 is configured as illustrated in FIGS. 1 and 2 and described above. It should be appreciated that the cloud platform core infrastructure 50 may include other devices and services. For example, the cloud platform core infrastructure 50 may include a fabric controller 86 configured to monitor and manage a health status of the plurality of nodes 24 and coordinate resources for the plurality of virtual machines 26. As another example, the cloud platform core infrastructure 50 may include a network controller 88 configured to deploy, monitor, and manage various network elements such as, for example, software load balancers, virtual networking policies, datacenter firewall policies, etc.

As another example, the cloud platform core infrastructure 50 may include a storage service 90 configured to manage storage devices associated with the plurality of virtual machines 26. The storage devices, such as disk drives, solid state drives, etc., may be located at remote locations, and the storage service 90 may be configured to manage a network connection between each of the virtual machines 26 and their associated storage device at the remote location. As another example, the cloud platform core infrastructure 50 may include network switches 92, such as, for example, the TOR network switches 30, and the higher-level switching infrastructure 46 (L1) and (L2) that connects the TOR network switches together. The cloud platform 22 may also include other cloud platform devices 94 and services outside of the cloud platform core infrastructure 50 that may monitor, manage, or otherwise effect operation of the plurality of nodes 24. It should be appreciated that the examples of cloud platform infrastructure described above are merely exemplary, and that the cloud platform 22 and the cloud platform core infrastructure 50 may include other software and hardware elements not illustrated in FIG. 3.

The cloud platform 22 further includes a user interface system 52 that provides a backend for a user interface that may be presented to a user via a user computer device 48. In one example, the user interface system 52 may take the form of a web portal that includes a user interface that is displayed to the user via a browser executed on the user computer device 48. As another example, the user interface may be included in an application executed on the user computer device 48 and configured to send and receive data with the user interface system 52. The user may enter user input 54 to the user interface which is configured to send the user input 54 to the user interface system 52.

The user interface system 52 may store user accounts associated with each user of the user computer devices 48. Through the user accounts, users may be associated with particular virtual machines 26 run on nodes of the cloud platform core infrastructure 50. A user may upload a cloud application 56 to the cloud platform 22 to be run within their associated virtual machine(s) 26. It should be appreciated that the term "user" used herein may refer to a group of users associated with a single user account, such as, for example, a group of developers that are collaborating to develop the cloud application 56. As another example, the "user" may be an authorized user or user account that is granted administrative control over the associated virtual machine and cloud application.

The cloud application 56 may take any suitable form, such as, for example, a web application, a game, etc. The cloud application 56 may run within the user's associated virtual machine 26 using the hardware resources of the plurality of nodes 24 of the cloud platform core infrastructure 50. In one example, the virtual machine 26 may additionally utilize other hardware resources outside of the plurality of nodes 24. For example, the user's virtual machine 26 may have an associated storage disk that stores visual data and other types of application data for the cloud application 56. The one or more nodes 24 running the user's virtual machine 26 may being configured to communicate with the associated storage disk over a network to send and receive data for the cloud application 56. The storage disk may take the form of a solid-state hard drive, a disk drive, or another type of storage disk. In one example, the storage service 90 of the cloud platform core infrastructure 50 may be configured to mediate communication between the user's virtual machine with the associated storage disk.

As illustrated in FIG. 3, the cloud platform 22 is further configured to provide a fault condition experimentation service for users to design fault experiments to test the resiliency of their cloud applications 56 to the various types of fault conditions that typically occur during production. Using the user interface provided by the user interface system 52, user may design a suitable fault experiment by selecting from among a plurality of different fault condition experimentation parameters 58. The user interface system 52 is configured to receive user input of fault condition experimentation parameters 58 from a user for a target virtual machine 26 associated with the user from the user computer device 48 via the user interface. The fault condition experimentation parameters 58 specify various characteristics of the fault experiment 62 and the fault conditions that the cloud platform 22 should simulate for the cloud application 56 to test its resiliency. These fault condition experimentation parameters 58 may be stored and transmitted as an extensible file, for example, and may be interpreted by a downstream interpreter, such as fault condition controller 64, which is a program executed on a server computing device having a processor. In this way, the fault experimentation parameters 58 enable an implementation in which the software infrastructure for fault testing is expressed as code interpretable by the environment.

Figure 4:
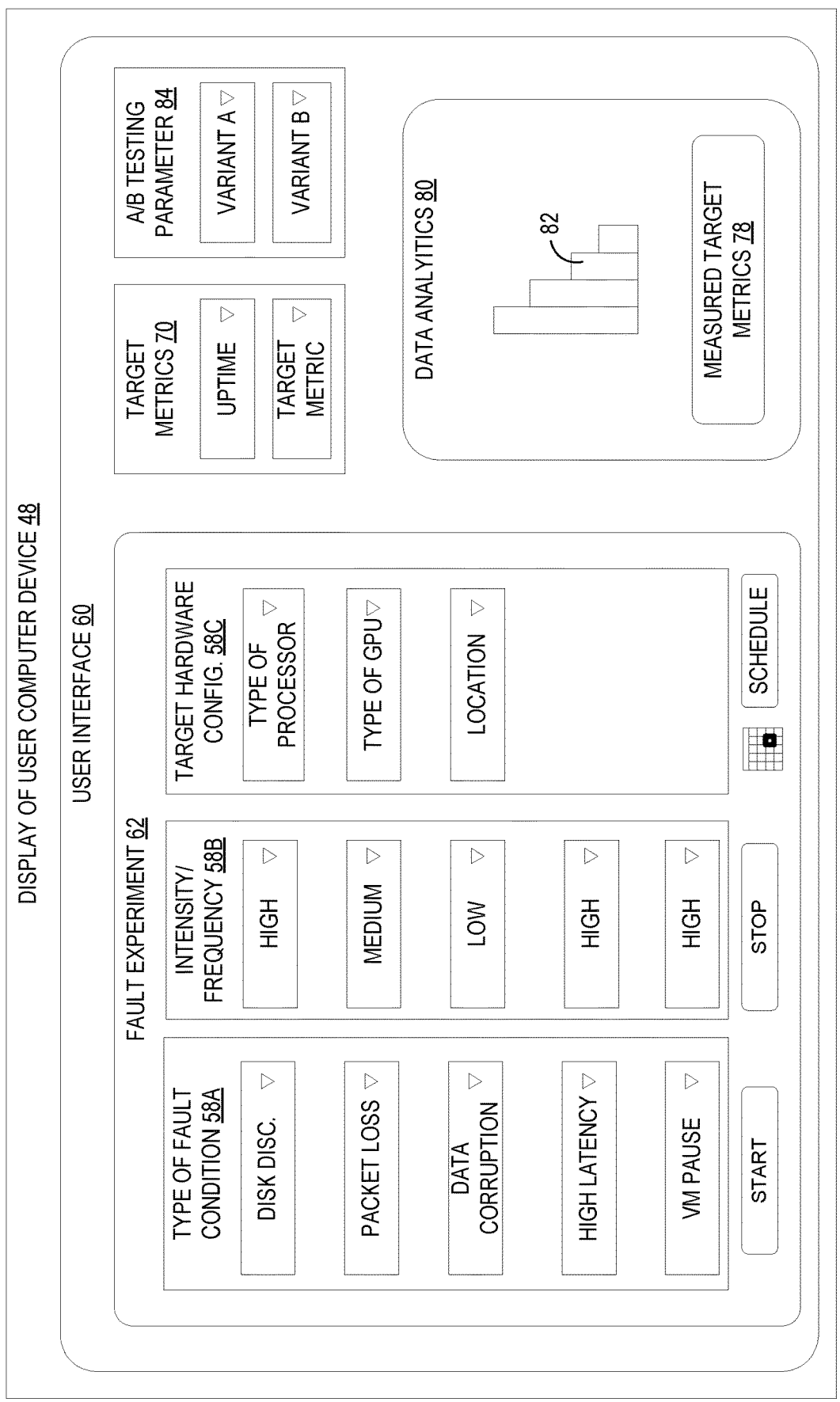
FIG. 4 shows an example user interface for specifying fault condition experimentation parameters for the computer system of FIG. 3.

FIG. 4 illustrates an example user interface 60 presented to the user via a display of the user computer device 48. The user interface 60 may include a fault experiment graphical user interface (GUI) element 62. Using the fault experiment GUI element 62, the user may enter input for various fault condition experimentation parameters 58. The user interface 60 may include various GUI elements for the user to select the fault condition experimentation parameters 58, such as, for example, a dropdown selector. However, it should be appreciated that any suitable GUI input method may be used to enter user input for the fault condition experimentation parameters 58.

In the illustrated example, the fault condition experimentation parameters 58 include a type of fault condition 58A. The type of fault conditions 58A may be selected from among a network disruption fault condition, a disk disruption fault condition, a memory disruption fault condition, etc. As a few additional non-limiting examples, the type of fault conditions 58A may include a disk disconnect fault, a packet loss fault, a high latency fault, a pack reordering fault, a packet disorientation fault, a slow start fault, a session hang fault, a disk write and/or disk read fault, a data loss fault, etc. The type of fault condition 58A may also include other network and computer behaviors that may potentially cause issues for the cloud application 56, such as, for example, sending the cloud application data in a form that was not expected by the cloud application in response to a request. As another example, pausing the virtual machine 26 running the cloud application 56 that occurs when system components of the host node 24 are modified. As yet another example, a kernel fault of the host server instance 38 of the host node 24. It should be appreciated that the types of fault conditions 58A are not limited to the examples described above, and may include any suitable type of network or computer fault that may impact the performance of the virtual machines 26 and their cloud applications 56 run on those virtual machines.

In one example, the fault condition experimentation parameters 58 further include a fault condition intensity 58B and/or fault condition frequency for the types of fault conditions 58A selected by the user. The fault condition intensity/frequency 58B may be selected for the fault experiment 62 as a whole, or may be selected for each individual type of fault condition 58A selected by the user. In the illustrated example, the fault condition intensity 58B may be selected from a low, medium, or high intensity value. For example, the fault condition intensity for a disk disconnect type of fault condition may cause the disk to be disconnected for a longer or shorter period of time depending upon the selected intensity. As another example, the fault condition intensity for a data corruption type of fault condition may cause a larger amount or smaller amount of data to be corrupted. A fault condition frequency may specify how often the type of fault condition 58A is to occur during the fault experiment 62, such as, for example, every 5 second, every 2 minutes, every hour, every day, etc. It should be appreciated that the example fault condition intensities 58B and frequencies described above are merely exemplary, and that other methods of varying the intensity and frequency of the fault conditions may be utilized.

In another example, the fault condition experimentation parameters 58 further include a target hardware configuration 58C for hardware resources of the nodes 24 that will run the cloud application 56. As described in FIGS. 1 and 2, the hardware components of the plurality of nodes 24 may vary across the hardware plane 14. For example, over time additional node clusters may be added to the cloud platform 22, existing node clusters may be removed, existing node clusters may be upgraded, existing node clusters may be located in different locations, etc. The varying hardware components and geographical locations of the nodes 24 across the cloud platform 22 may potentially affect the performance of cloud applications 56 run in virtual machines 26. Thus, the user may select target hardware configurations 58C for their cloud application 56 to be run on during the fault experiment 62. In one example, the target hardware configuration 58C may include a location such as region or specific target node cluster. As few non-limiting examples, the target hardware configuration 58C may include a hardware device age, a target processor specification, a target GPU specification, a total number of nodes running the virtual machine 26 and the cloud application 56 in concert, a total number of virtual machines 26 running the cloud application 56, a virtual machine 26 type/specification, a storage disk specification, etc. It should be appreciated that the target hardware configurations 58C described above are merely exemplary, and that other suitable node characteristics may be targeted.

As illustrated in FIG. 4, the user interface 60 may include other GUI elements for controlling the fault experiment 62. For example, the user interface 60 may include a start button and a stop button GUI element for starting and stopping/pausing the fault experiment 62. As another example, the user interface 60 may also include a scheduling GUI element for selecting a day, week, month, time of day, or other type of time period for the fault experiment 62 to be run.

Turning back to FIG. 3, the user interface system 52 is configured to receive the user input of fault condition experimentation parameters 58. The received fault condition experimentation parameters 58 may be sent to a fault condition controller 64. In one example, the user interface system 52 may be implemented by a computer system of the cloud platform 22 that is separate from the cloud platform core infrastructure 50. Similarly, the fault condition controller 64 may also be implemented by another computer system of the cloud platform 22 that is separate from the cloud platform core infrastructure 50. As another example, the fault condition controller 64 may be implemented as part of the cloud platform core infrastructure 50. It should be appreciated that any suitable computer system organization and infrastructure may be utilized to perform the functions of the user interface system 52 and the fault condition controller 64 described herein.

As illustrated in FIG. 3, the cloud platform 22 includes a fault condition injection engine 66 configured to generate fault conditions on selected nodes of the plurality of nodes 24 of the cloud platform 22. The fault condition injection engine 66 may include agents 66A on each of the plurality of nodes 24 of the hardware plane 14 of the cloud platform 22 configured to perform to perform the functions of the fault condition injection engine 66 on that node. For example, the fault condition injection engine 66 is configured to generate one or more of the fault conditions described above with reference to FIG. 4. The fault condition controller 64 is configured to communicate with the fault condition injection engine 66 agents 66A to perform the fault experiment 62 according to the fault condition experimentation parameters 58 entered by the user.

In one example, before performing the fault experiment 62, the cloud platform 22 allocates a set of nodes 24A of the plurality of nodes 24 for a controlled sandbox environment configured to run the target virtual machine 26A of the user. To allocate the set of nodes 24A, the cloud platform may be configured to determine one or more nodes 24 of hardware plane 14 that are not currently allocated to other virtual machines 26 of the virtual machine plane 16. The cloud platform 22 may then allocate the determined one or more nodes 24 to the target virtual machine 26A associated with the user or user account that is attempting to perform the fault experiment 62 on their cloud application. After the determined one or more nodes 24 have been allocated to the target virtual machine 26A, the cloud platform 22 may configured those nodes as a controlled sandbox environment that is configured to prevent other virtual machines 26 associated with other users from being run on the allocated set of nodes 24A of the plurality of nodes 24. By preventing other virtual machines 26 from being run on the allocated set of nodes 24A, the cloud platform 22 may prevent the fault conditions generated by the fault condition injection engine 66 on the allocated set of nodes 24A from inadvertently affecting the virtual machines 26 and cloud applications 56 of other users.

In one example, when allocating the nodes 24 for the fault experiment 62, the cloud platform 22 may be further configured to allocate the set of nodes of the plurality of nodes 24 based on the target hardware configuration 58C entered by the user in the fault condition experimentation parameters 58. That is, the cloud platform 22 may select one or more nodes of the hardware plane 14 that include hardware configurations that match or meet a threshold degree of matching with the target hardware configuration 58C, which, for example, may include a location such as region or specific target node cluster, a hardware device age, a target processor specification, a target GPU specification, a storage disk specification, etc. It should be appreciated that during allocation of the set of nodes, the cloud platform 22 may be configured to reallocate the plurality of nodes 24 of the hardware plane 14 for the virtual machine plane 16 to free up suitable nodes for allocated to the target virtual machine 26A.

After allocating the set of nodes to the target virtual machine(s) 26A and preventing other virtual machines from being run on the allocated set of nodes 24A, the fault condition control 64 may be configured to perform control on the fault condition injection engine 66 agents 66A associated with the allocated set of node(s) 24A to generate fault conditions on the allocated set of nodes 24A based on the fault condition experimentation parameters 58. The fault condition injection engine 66 may be configured to perform the type of fault conditions 58A according to the fault condition intensity 58B and/or fault condition frequency specified by the user via user input to the user interface 60. It should be appreciated that the fault condition injection engine 66 agents 66A operate directly on the allocated set of node(s) 24A, and other cloud platform infrastructure, rather than merely simulating a fault condition within the target virtual machine 26A.

For example, to generate a network disruption fault condition such as a packet loss fault, the fault condition injection engine 66 may be configured to intercept packets being sent to/from the target virtual machine 26A through the hypervisor plane 18. As the network packets are intercepted at the level of the allocated set of node(s) 24A, the target virtual machine 26A experiences a packet loss fault condition as it would happen during production. Similarly, the fault condition injection engine 66 may be configured to delay packets to cause a high latency fault condition, reorder incoming packets to cause a packet reordering fault condition, etc.

As another example, to generate a disk disruption fault condition such as a disk disconnect fault, the fault condition injection engine 66 may be configured to prevent the target virtual machine 26A from connecting to a disk storage device associated with the target virtual machine 26A. To generate a data corruption fault condition, the fault condition injection engine 66 may be configured to intercept the network packets sent from the associated disk storage device and send substitute network packets to the target virtual machine 26A that contain data in a corrupted format.

It should be appreciated that the methods of generating fault conditions described above are merely exemplary, and that the fault condition injection engine 66 may perform other suitable processes on the allocated set of node(s) 24A not specifically described above to simulate the full spectrum of fault conditions that may occur during production. As these fault conditions are generated directly on the allocated set of node(s) 24A, those fault conditions appear to happen as they would during production from the perspective of the target virtual machine(s) 26A being run on the allocated set of node(s) 24A. In this manner, the cloud application 56 running on the target virtual machine(s) 26A may experience various types of fault conditions 58A at a fault condition intensity 58B and/or fault condition frequency specified by the user.

In one example, the fault condition injection engine 66 further includes agents 66A on other infrastructure elements of the cloud platform 22. For example, the fabric controller 86, the network controller 88, the storage service 90, the network switches 92, and other cloud platform devices 94 may each include a fault condition injection engine agent 66A configured to generate fault conditions on those infrastructure elements.

As illustrated in FIG. 3, the cloud platform 22 may further include a metric collection engine 68 configured to measure the one or more target metrics 70 for the target virtual machine 26A while the fault condition injection engine 66 generates fault conditions on the allocated set of nodes 24A. Each node 24 of the hardware plane 14 of the cloud platform core infrastructure 50 may include an agent 68A of the metric collection engine 68 configured to detect one or more target metrics 70 on that node 24. In one example, other infrastructure elements of the cloud platform may also include a metric collection engine agent 68A. For example, the fabric controller 86, the network controller 88, the storage service 90, the network switches 92, and other cloud platform devices 94 may each include a metric collection engine agent 68A configured to measure fault condition data 76 and the one or more target metrics 70.

Each virtual machine 26 of the virtual machine plane 16 may also include a metric collection software development kit (SDK) 72. Using the metric collection SDK 72, users may configure their cloud applications 56 to detect one or more target metrics 70 at the cloud application 56, and send the detected one or more target metrics 70 to a data analytics system 74 of the cloud platform 22 through the target virtual machine(s) 26A.

In the illustrated example, the data analytics system 74 may be configured to receive fault condition data 76 from the fault condition injection engine 66 and measured target metric data 78 from the metric collection engine 68 and the target virtual machine(s) 26A. The fault condition data 76 may include the fault condition experimentation parameters 58 entered by the user, and data summarizing the fault conditions generated by the fault condition injection engine 66. The measured target metric data 78 may include measured values for one or more target metrics detected by the metric collection engine 68 and/or by the cloud application 56 itself running in the target virtual machine(s) 26A. For example, the cloud application 56 may be configured to continuously measure one or more target metrics and send the measured one or more target metrics to the metric collection engine 68 in a format specified by the metric collection SDK 72. The data analytics system 74 may be configured to gather the fault condition data 76 and the measured target metric data 78 for the target virtual machine(s) 26A, and perform data analysis to generate data analytics 80 that may be presented to the user via the user interface system 52.

Turning to FIG. 4, the user interface 60 from the user interface system 52 may be configured to receive user input 54 of the one or more target metrics 70. In one example, the user interface 60 may provide GUI elements for the user to select one or more target metrics 70 from a list of target metrics that the metric collection engine 68 is configured to detect and measure. For example, the target metrics 70 may include an uptime of the cloud application 56 being run in the target virtual machine 26A. As another example, the target metrics 70 may include a total number of data loss instances that occurred at the cloud application 56. It should be appreciated that other suitable target metrics 70 not described above may also be measured and detected by the metric collection engine 68.

As described above, the one or more target metrics 70 selected by the user may be tracked and measured while the fault condition injection engine 66 generates fault conditions of the allocated set of node(s) 24A. The data analytics system 74 may gather the measured target metric data 78, and send the measured target metric data 78 to the user interface system 52. As illustrated in FIG. 4, the user interface system 52 may be configured to present the measured one or more target metrics 78 to the user via the user interface 60 displayed on the display of the user computer device 48. In one example, the raw data for the measured one or more target metrics 78 may be accessed by the user via the user interface 60. In another example, the measured one or more target metrics 78 may be processed by the data analytics system 74 to generate one or more data visualizations 82 that represent the measured one or more target metrics. In this example, the data analytics system 74 may be configured to determine relationships between the fault condition data 76 and the measured target metrics 78, and generate the one or more data visualizations 82 to show the determined relationships. For example, the one or more data visualizations 82 may show how the one or more target metrics were impacted by the fault conditions generated by the fault condition injection engine 66.

In one example, the user may select an A/B testing configuration via the user interface 60 of the user interface system 52. The user may enter user input 54 of two variants A and B to be compared. The user interface system 62 may be configured to receive user input 54 of an A/B testing parameter 84, which may include the variant A and the variant B entered by the user. For example, the variant A may include the target virtual machine while fault conditions are being generated, and the variant B may include the target virtual machine while fault conditions are not being generated. As another example, the variant A may include a first version of the cloud application while fault conditions are being generated, and the variant B may include a second version of the cloud application while the same fault conditions are being generated. As another example, the variant A may include a first set of people using the cloud application while fault conditions are being generated, and the variant B may include a second set of people using the cloud application while fault conditions are being generated. It should be appreciated that the example A/B testing parameters 84 described above are merely exemplary, and that other variant configurations may be used for the A/B testing.

In this example, the fault condition injection engine 66 may be configured to generate fault conditions on the allocated set of nodes 24A based on at least the A/B testing parameter 70 entered by the user. For example, the fault condition controller 64 may be configured to allocate the set of nodes based on the A/B testing parameter 70, and instruct corresponding fault condition injection engine 66 agents on the allocated set of nodes 24A to generate fault conditions based on the A/B testing parameter 70 and the fault condition experimentation parameters 58. The metric collection engine 68 may be configured to track and measure the one or more target metrics 70 while the A/B test is performed. The data analytics system 74 may then be configured to generate data analytics 80 for the A/B test and send the data analytics 80 to the user interface system 52.

In one example, the user interface system 52 may be configured to present the data analytics 80 for the A/B test. For example, the data analytics 80 may include a comparison between the one or more target metrics 70 measured for the target virtual machine 26A while the fault condition injection engine 66 generates fault conditions on the allocated set of nodes 24A and the one or more target metrics 70 measured for the target virtual machine 26A while the fault condition injection engine 66 is not generating fault conditions. For example, the metric collection engine 68 may be configured to measure the one or more target metrics 70 while fault conditions are being generated on the allocated set of nodes 24A, and while faults conditions are not being generated on the allocated set of nodes 24A. The data analytics system 74 may compare the measured one or more target metrics 70 of both scenarios, and generate a data visualization 82 representing a relationship between the measured target metrics 78 for both scenarios. The user interface system 52 may be configured to display the data visualization 82 to the user via the user interface 60.

Using the cloud platform 22 illustrated in FIG. 3, users may design fault experiments 62 to test the resiliency of their cloud applications 56 to the full spectrum of fault conditions that may occur during production. It should be appreciated that the fault experimentation systems and methods described herein generate fault conditions on the nodes 24 of the cloud platform 22 and other cloud platform infrastructure, such as the fabric controller 86, the network controller 88, the storage service 90, the network switches 92, and other cloud platform devices 94. In this manner, the described fault experimentation system provides the potential advantage of accurately simulating fault conditions as they would happen during production, such as, for example, by generating a real network fault condition via the fault condition injection engine agents 66A on the network controller 88 and the network switches 92. Additionally, the described fault experimentation system does not require additional testing binaries or other software to be run in the virtual machines 26 to perform the fault experiments 62, and thus minimizes the potential confounding factors introduced by the additional software being run in the same virtual machine.

Figure 5:
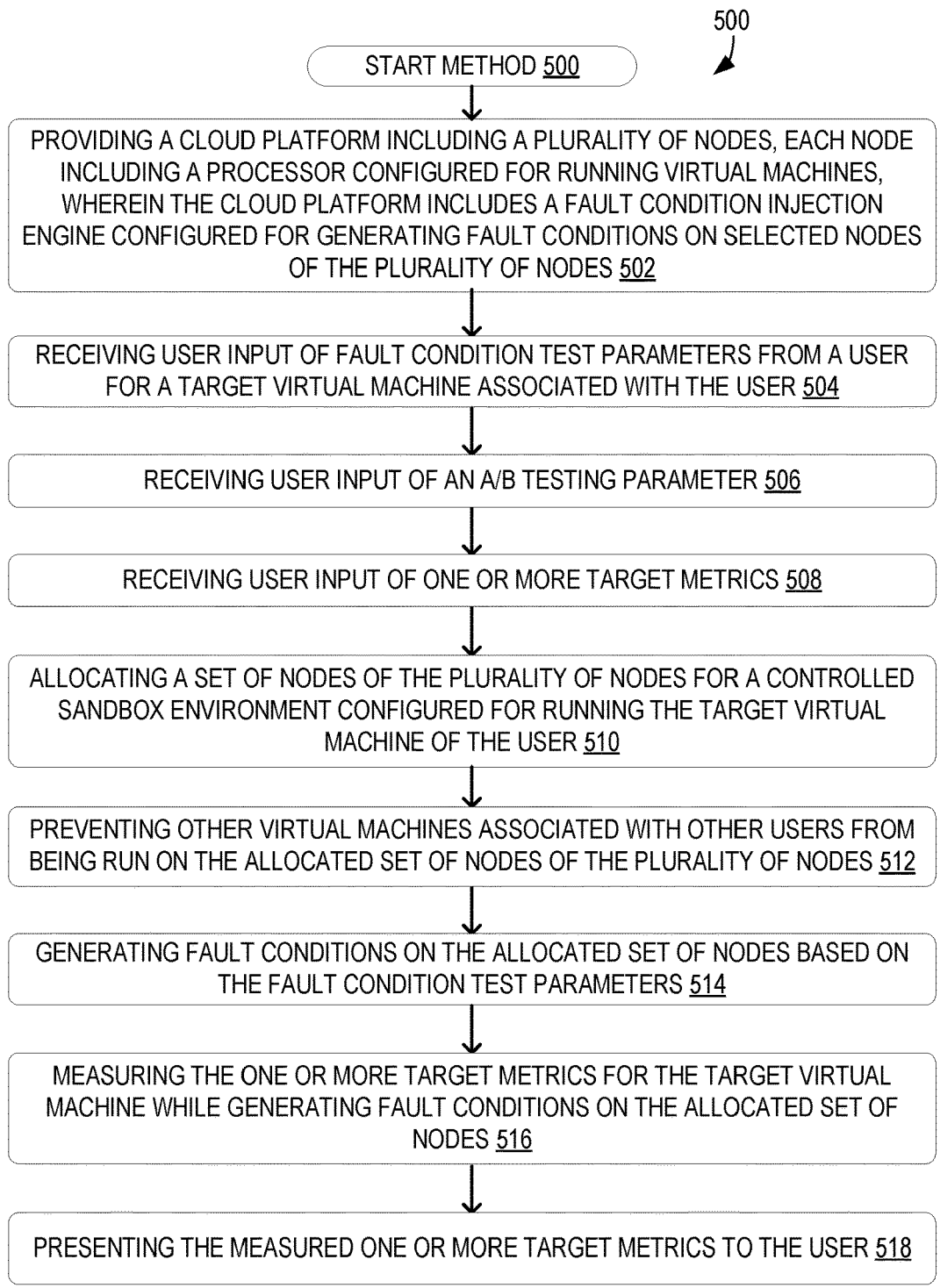
FIG. 5 shows a flowchart for a method of fault condition experimentation for the cloud platform of FIG. 1.

FIG. 5 is a flowchart of a method 500 implemented by a computer system. Method 500 may be executed using the systems described above or utilizing other suitable hardware and software elements.

At 502, the method 500 may include providing a cloud platform including a plurality of nodes. Each node may include a processor configured for running virtual machines. The cloud platform may include a fault condition injection engine configured for generating fault conditions on selected nodes of the plurality of nodes. An example cloud platform and network infrastructure are illustrated and FIG. 1, and form the cloud platform core infrastructure 50 of the computer system 10 of FIG. 3.

At 504, the method 500 may include receiving user input of fault condition experimentation parameters from a user for a target virtual machine associated with the user. A user interface system 52 of the cloud platform 22 may store user profiles for a plurality of different users. The user profiles may be associated with virtual machines being run on the cloud platform core infrastructure 50. By logging into their user profile, users may customize a fault experiment that may be run on their associated virtual machine to test the resiliency of their cloud application that is run in their associated virtual machine.

In one example, the fault condition experimentation parameters include a type of fault condition. The type of fault conditions 58A may be selected from among a network disruption fault condition, a disk disruption fault condition, a memory disruption fault condition, etc. As a few additional non-limiting examples, the type of fault conditions 58A may include a disk disconnect fault, a packet loss fault, a high latency fault, a pack reordering fault, a packet disorientation fault, a slow start fault, a session hang fault, a disk write and/or disk read fault, a data loss fault, etc. Other types of fault conditions 58A are described above with reference to FIG. 4.

In another example, the fault condition experimentation parameters include a fault condition intensity. In the example illustrated in FIG. 4, the fault condition intensity 58B may be selected from a low, medium, or high intensity value. For example, the fault condition intensity for a disk disconnect type of fault condition may cause the disk to be disconnected for a longer or shorter period of time depending upon the selected intensity. As another example, the fault condition intensity for a data corruption type of fault condition may cause a larger amount or smaller amount of data to be corrupted. A fault condition frequency parameter of the fault condition intensity may specify how often the type of fault condition 58A is to occur during the fault experiment 62, such as, for example, every 5 second, every 2 minutes, every hour, every day, etc.

In another example, the fault condition experimentation parameters include a target hardware configuration. The varying hardware components and geographical locations of the nodes 24 across the cloud platform 22 described with reference to FIGS. 1 and 2 may potentially affect the performance of cloud applications 56 run in virtual machines 26. In one example, the target hardware configuration 58C may include a location such as region or specific target node cluster. As few non-limiting examples, the target hardware configuration 58C may include a hardware device age, a target processor specification, a target GPU specification, a total number of nodes running the virtual machine 26 and the cloud application 56 in concert, a total number of virtual machines 26 running the cloud application 56, a virtual machine 26 type/specification, a storage disk specification, etc.

At 506, the method 500 may include receiving user input of an A/B testing parameter. The A/B testing parameter may include a variant A and a variant B that will be tested and compared. For example, the variant A may include the target virtual machine while fault conditions are being generated, and the variant B may include the target virtual machine while fault conditions are not being generated.

At 508, the method 500 may include receiving user input of one or more target metrics. For example, the target metrics 70 may include an uptime of the cloud application 56 being run in the target virtual machine 26A. As another example, the target metrics 70 may include a total number of data loss instances that occurred at the cloud application 56.

At 510, the method 500 may include allocating a set of nodes of the plurality of nodes for a controlled sandbox environment configured for running the target virtual machine of the user. To allocate the set of nodes, method may include determining one or more nodes of hardware plane illustrated in FIG. 1 that are not currently allocated to other virtual machines of the virtual machine plane. The cloud platform may allocate the determined one or more nodes to the target virtual machine. In one example, step 510 may further include allocating the set of nodes of the plurality of nodes based on the target hardware configuration. That is, the method may include determining one or more nodes of the hardware plane illustrated in FIG. 1 that include hardware specifications that match or have a threshold degree of match with the target hardware configuration specified by the user. The determine one or more nodes may by allocated as the set of nodes to run the user's target virtual machine.

At 512, the method 500 may include preventing other virtual machines associated with other users from being run on the allocated set of nodes of the plurality of nodes. By preventing other virtual machines from being run on the allocated set of nodes, the method 500 may prevent the fault conditions generated by the fault condition injection engine on the allocated set of nodes from inadvertently affecting the virtual machines and cloud applications of other users.

At 514, the method 500 may include generating fault conditions on the allocated set of nodes based on the fault condition experimentation parameters. In one example, with reference to FIGS. 1 and 3, to generate a network disruption fault condition such as a packet loss fault, the fault condition injection engine 66 may be configured to intercept packets being sent to/from the target virtual machine 26A through the hypervisor plane 18. As the network packets are intercepted at the level of the allocated set of node(s) 24A, the target virtual machine 26A experiences a packet loss fault condition as it would happen during production. Similarly, the fault condition injection engine 66 may be configured to delay packets to cause a high latency fault condition, reorder incoming packets to cause a packet reordering fault condition, etc. In one example, step 514 may further include generating fault conditions on the allocated set of nodes based on at least the A/B testing parameter.

At 516, the method 500 may include measuring the one or more target metrics for the target virtual machine while generating fault conditions on the allocated set of nodes. In the example illustrated in FIG. 3, each node 24 of the hardware plane 14 of the cloud platform core infrastructure 50 may include an agent of a metric collection engine 68 configured to detect one or more target metrics 70 on that node 24. Each virtual machine 26 of the virtual machine plane 16 may also include a metric collection software development kit (SDK) 72. Using the metric collection SDK 72, users may configure their cloud applications 56 to detect one or more target metrics 70 at the cloud application 56. The metric collection engine 68 may measure the one or more target metrics concurrently with the fault condition injection engine 66 generating fault conditions.

At 518, the method 500 may include presenting the measured one or more target metrics to the user. In examples with A/B testing, step 518 may further include presenting a comparison between the one or more target metrics measured for the target virtual machine while generating fault conditions on the allocated set of nodes and the one or more target metrics measured for the target virtual machine while not generating fault conditions. The measured one or more target metrics may be presented to the user via a user interface displayed on a display of the user's computer device. In one example, the raw data for the measured one or more target metrics may be presented to the user. In another example, the method 500 may further include generating a data visualization of the measured one or more target metrics, and presenting the data visualization to the user via the display.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
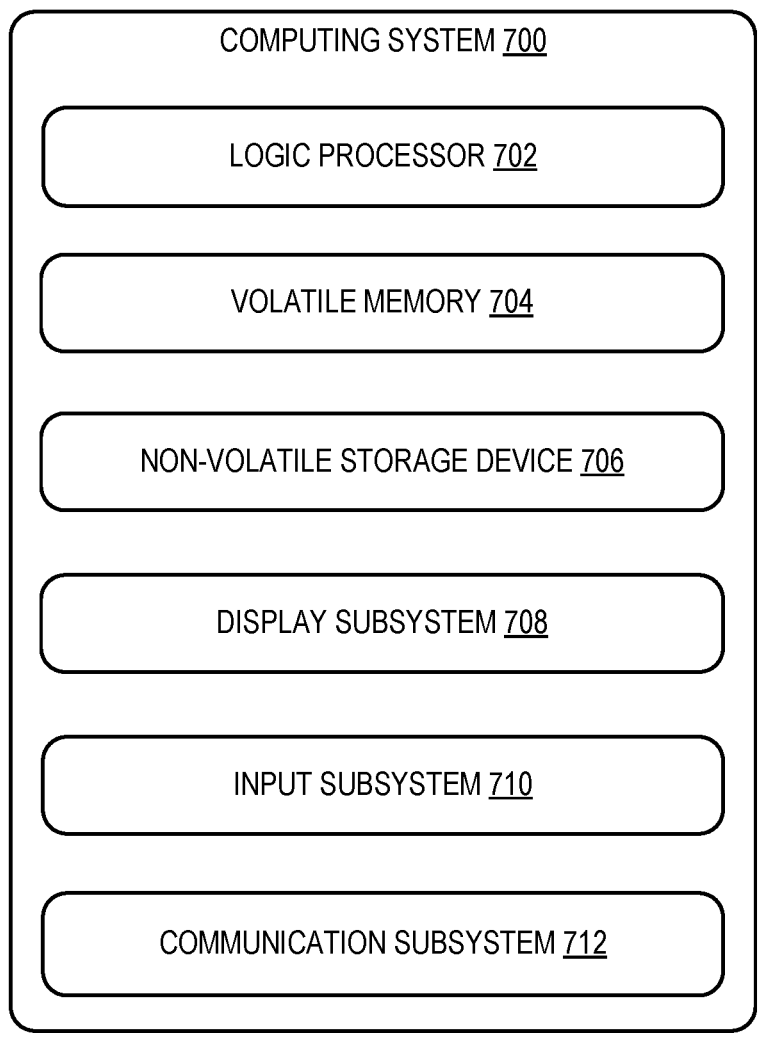
FIG. 6 shows a schematic view of an example computing environment in which nodes of the cloud platform of FIG. 1 may be enacted.

FIG. 6 schematically shows a non-limiting embodiment of a computing system 700 that can enact one or more of the methods and processes described above. Computing system 700 is shown in simplified form. Computing system 700 may embody the computer system 10 and each node of the cloud platform 22 described above. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 6.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 706 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer system comprising a cloud platform including a plurality of nodes. Each node includes a processor configured to run virtual machines. The cloud platform includes a fault condition injection engine configured to generate fault conditions on selected nodes of the plurality of nodes. The computer system further comprises a user interface system configured to receive user input of fault condition experimentation parameters from a user for a target virtual machine associated with the user. The cloud platform allocates a set of nodes of the plurality of nodes for a controlled sandbox environment configured to run the target virtual machine of the user. The fault condition injection engine generates fault conditions on the allocated set of nodes based on the fault condition experimentation parameters. In this aspect, additionally or alternatively, the cloud platform may be configured to prevent other virtual machines associated with other users from being run on the allocated set of nodes of the plurality of nodes. In this aspect, additionally or alternatively, the fault condition experimentation parameters may include a type of fault condition. In this aspect, additionally or alternatively, the type of fault condition may be selected from the group consisting of a network disruption fault condition, a disk disruption fault condition, and a memory disruption fault condition. In this aspect, additionally or alternatively, the fault condition experimentation parameters may include a target hardware configuration, and the cloud platform may be configured to allocate the set of nodes of the plurality of nodes based on the target hardware configuration. In this aspect, additionally or alternatively, the fault condition experimentation parameters may include a fault condition intensity. In this aspect, additionally or alternatively, the user interface system may be further configured to receive user input of one or more target metrics. The cloud platform may include a metric collection engine configured to measure the one or more target metrics for the target virtual machine while the fault condition injection engine generates fault conditions on the allocated set of nodes. The user interface system may be configured to present the measured one or more target metrics to the user. In this aspect, additionally or alternatively, the user interface system may be further configured to receive user input of an A/B testing parameter. The fault condition injection engine may be configured to generate fault conditions on the allocated set of nodes based on at least the A/B testing parameter. In this aspect, additionally or alternatively, the user interface system may be configured to present a comparison between the one or more target metrics measured for the target virtual machine while the fault condition injection engine generates fault conditions on the allocated set of nodes and the one or more target metrics measured for the target virtual machine while the fault condition injection engine is not generating fault conditions.

Another aspect provides a method comprising providing a cloud platform including a plurality of nodes. Each node includes a processor configured for running virtual machines. The cloud platform includes a fault condition injection engine configured for generating fault conditions on selected nodes of the plurality of nodes. The method further comprises receiving user input of fault condition experimentation parameters from a user for a target virtual machine associated with the user, allocating a set of nodes of the plurality of nodes for a controlled sandbox environment configured for running the target virtual machine of the user, and generating fault conditions on the allocated set of nodes based on the fault condition experimentation parameters. In this aspect, additionally or alternatively, the method may further comprise preventing other virtual machines associated with other users from being run on the allocated set of nodes of the plurality of nodes. In this aspect, additionally or alternatively, the fault condition experimentation parameters may include a type of fault condition. In this aspect, additionally or alternatively, the type of fault condition may be selected from the group consisting of a network disruption fault condition, a disk disruption fault condition, and a memory disruption fault condition. In this aspect, additionally or alternatively, the fault condition experimentation parameters may include a target hardware configuration, and the method may further comprise allocating the set of nodes of the plurality of nodes based on the target hardware configuration. In this aspect, additionally or alternatively, the fault condition experimentation parameters may include a fault condition intensity. In this aspect, additionally or alternatively, the method may further comprise receiving user input of one or more target metrics, measuring the one or more target metrics for the target virtual machine while generating fault conditions on the allocated set of nodes, and presenting the measured one or more target metrics to the user. In this aspect, additionally or alternatively, the method may further comprise receiving user input of an A/B testing parameter, and generating fault conditions on the allocated set of nodes based on at least the A/B testing parameter. In this aspect, additionally or alternatively, the method may further comprise presenting a comparison between the one or more target metrics measured for the target virtual machine while generating fault conditions on the allocated set of nodes and the one or more target metrics measured for the target virtual machine while not generating fault conditions.

Another aspect provides a computer device comprising a processor configured to present a user interface for a user account associated with a target virtual machine run on a node of a cloud platform that includes a plurality of nodes. The cloud platform includes a fault condition injection engine configured to generate fault conditions on selected nodes of the plurality of nodes. The processor is further configured to receive user input of fault condition experimentation parameters from a user of the user account for the target virtual machine, and send the fault condition experimentation parameters to the cloud platform to cause the cloud platform to allocate a set of nodes of the plurality of nodes for a controlled sandbox environment configured to run the target virtual machine of the user and generate fault conditions on the allocated set of nodes based on the fault condition experimentation parameters. In this aspect, additionally or alternatively, the processor may be further configured to receive one or more target metrics from the user of the user account, send the one or more target metrics to the cloud platform to cause the cloud platform to measure the one or more target metrics for the target virtual machine while the fault condition injection engine generates fault conditions on the allocated set of nodes, receive the measured one or more metrics from the cloud platform, and present the measured one or more target metrics to the user.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
a cloud platform including a plurality of nodes, each node including a processor configured to run virtual machines, wherein the cloud platform includes a fault condition injection engine configured to generate fault conditions on selected nodes of the plurality of nodes; and
a user interface system configured to receive user input of fault condition experimentation parameters from a user for a target virtual machine associated with the user;
wherein the cloud platform allocates a set of nodes of the plurality of nodes for a controlled sandbox environment configured to run the target virtual machine of the user;
wherein the fault condition injection engine generates fault conditions on the allocated set of nodes based on the fault condition experimentation parameters;
wherein the fault condition injection engine is executed by the cloud platform in a hypervisor plane of the computer system to cause the fault conditions to be generated on the nodes in a hardware plane of the computer system; and
wherein the target virtual machine is executed in a virtual machine plane of the computer system, and the hardware plane in which the fault conditions are generated is inaccessible to the target virtual machine.

2. The computer system of claim 1, wherein the cloud platform is configured to prevent other virtual machines associated with other users from being run on the allocated set of nodes of the plurality of nodes.

3. The computer system of claim 1, wherein the fault condition experimentation parameters include a type of fault condition.

4. The computer system of claim 3, wherein the type of fault condition is selected from the group consisting of a network disruption fault condition, a disk disruption fault condition, and a memory disruption fault condition.

5. The computer system of claim 1, wherein the fault condition experimentation parameters include a target hardware configuration; and
wherein the cloud platform is configured to allocate the set of nodes of the plurality of nodes based on the target hardware configuration.

6. The computer system of claim 1, wherein the fault condition experimentation parameters include a fault condition intensity.

7. The computer system of claim 1, wherein the user interface system is further configured to receive user input of one or more target metrics;
wherein the cloud platform includes a metric collection engine configured to measure the one or more target metrics for the target virtual machine while the fault condition injection engine generates fault conditions on the allocated set of nodes; and
wherein the user interface system is configured to present the measured one or more target metrics to the user.

8. The computer system of claim 7, wherein the user interface system is further configured to receive user input of an A/B testing parameter; and wherein the fault condition injection engine is configured to generate fault conditions on the allocated set of nodes based on at least the A/B testing parameter.

9. The computer system of claim 8, wherein the user interface system is configured to present a comparison between the one or more target metrics measured for the target virtual machine while the fault condition injection engine generates fault conditions on the allocated set of nodes and the one or more target metrics measured for the target virtual machine while the fault condition injection engine is not generating fault conditions.

10. A method comprising:
providing a cloud platform including a plurality of nodes, each node including a processor configured for running virtual machines, wherein the cloud platform includes a fault condition injection engine configured for generating fault conditions on selected nodes of the plurality of nodes;
receiving user input of fault condition experimentation parameters from a user for a target virtual machine associated with the user;
allocating a set of nodes of the plurality of nodes for a controlled sandbox environment configured for running the target virtual machine of the user;
generating fault conditions on the allocated set of nodes based on the fault condition experimentation parameters;
executing, by the cloud platform, the fault condition injection engine in a hypervisor plane of the cloud platform to cause the fault conditions to be generated on the nodes in a hardware plane of the cloud platform; and
executing the target virtual machine in a virtual machine plane of the cloud platform, wherein the hardware plane in which the fault conditions are generated is inaccessible to the target virtual machine.

11. The method of claim 10, further comprising preventing other virtual machines associated with other users from being run on the allocated set of nodes of the plurality of nodes.

12. The method of claim 10, wherein the fault condition experimentation parameters include a type of fault condition.

13. The method of claim 12, wherein the type of fault condition is selected from the group consisting of a network disruption fault condition, a disk disruption fault condition, and a memory disruption fault condition.

14. The method of claim 10, wherein the fault condition experimentation parameters include a target hardware configuration; and
the method further comprises allocating the set of nodes of the plurality of nodes based on the target hardware configuration.

15. The method of claim 10, wherein the fault condition experimentation parameters include a fault condition intensity.

16. The method of claim 10, further comprising:
receiving user input of one or more target metrics;
measuring the one or more target metrics for the target virtual machine while generating fault conditions on the allocated set of nodes; and
presenting the measured one or more target metrics to the user.

17. The method of claim 16, further comprising:
receiving user input of an A/B testing parameter; and
generating fault conditions on the allocated set of nodes based on at least the A/B testing parameter.

18. The method of claim 17, further comprising presenting a comparison between the one or more target metrics measured for the target virtual machine while generating fault conditions on the allocated set of nodes and the one or more target metrics measured for the target virtual machine while not generating fault conditions.

19. A computer device comprising:
a processor configured to:
present a user interface for a user account associated with a target virtual machine run on a node of a cloud platform that includes a plurality of nodes, wherein the cloud platform includes a fault condition injection engine configured to generate fault conditions on selected nodes of the plurality of nodes;
receive user input of fault condition experimentation parameters from a user of the user account for the target virtual machine;
send the fault condition experimentation parameters to the cloud platform to cause the cloud platform to allocate a set of nodes of the plurality of nodes for a controlled sandbox environment configured to run the target virtual machine of the user, and generate fault conditions on the allocated set of nodes based on the fault condition experimentation parameters;
execute the fault condition injection engine in a hypervisor plane of the cloud platform to cause the fault conditions to be generated on the nodes in a hardware plane of the cloud platform; and
execute the target virtual machine in a virtual machine plane of the cloud platform, wherein the hardware plane in which the fault conditions are generated is inaccessible to the target virtual machine.

20. The computer device of claim 19, wherein the processor is further configured to:
receive one or more target metrics from the user of the user account;
send the one or more target metrics to the cloud platform to cause the cloud platform to measure the one or more target metrics for the target virtual machine while the fault condition injection engine generates fault conditions on the allocated set of nodes;
receive the measured one or more metrics from the cloud platform; and
present the measured one or more target metrics to the user.

* * * * *